(12) United States Patent
Stell et al.

(10) Patent No.: US 6,721,419 B1
(45) Date of Patent: Apr. 13, 2004

(54) METHOD AND SYSTEM FOR SELECTING A FREQUENCY FOR COMMUNICATION WITHIN A PREMISES NETWORK

(75) Inventors: Larry A. Stell, Austin, TX (US); Richard A. Gibbs, Round Rock, TX (US); Bernard F. Bareis, Plano, TX (US); Gerry A. Parker, Trophy Club, TX (US); Francis M. Sharp, Dallas, TX (US); Michael Gosha, Austin, TX (US)

(73) Assignee: PremiseNET Incorporated, Richardson, TX (US)

( * ) Notice: Subject to any disclaimer, the term of this patent is extended or adjusted under 35 U.S.C. 154(b) by 888 days.

(21) Appl. No.: 09/589,997

(22) Filed: Jun. 8, 2000

Related U.S. Application Data

(60) Provisional application No. 60/138,336, filed on Jun. 9, 1999.

(51) Int. Cl.[7] .......................... H04M 1/00; H04M 9/00; H04L 12/66
(52) U.S. Cl. .................... 379/413.02; 370/463
(58) Field of Search ................. 379/413.01, 413.02, 379/413.03, 90.01, 93.05, 93.09; 370/463, 354, 431, 481

(56) References Cited

U.S. PATENT DOCUMENTS

| | | | |
|---|---|---|---|
| 3,750,179 A | 7/1973 | Tewksbury | 343/175 |
| 4,238,850 A | 12/1980 | Vance | 370/27 |
| 4,480,327 A | 10/1984 | Vance | 370/27 |
| 4,513,413 A | 4/1985 | Gorman et al. | 370/30 |
| 4,528,656 A | 7/1985 | Morais | 370/30 |
| 4,685,099 A | 8/1987 | White et al. | 370/30 |
| 4,807,225 A | 2/1989 | Fitch | 370/71 |
| 5,586,120 A | 12/1996 | Cadd | 370/468 |
| 5,809,111 A * | 9/1998 | Matthews | 379/31 |
| 6,349,133 B1 * | 2/2002 | Matthews et al. | 379/90.01 |
| 6,542,500 B1 * | 4/2003 | Gerszberg et al. | 370/354 |
| 6,570,974 B1 * | 5/2003 | Gerszberg et al. | 379/218.01 |

* cited by examiner

*Primary Examiner*—Benny Tieu
(74) *Attorney, Agent, or Firm*—Baker Botts L.L.P.

(57) ABSTRACT

A method and system for selecting a frequency for communication within a premises network are disclosed that offer significant operational advantages. According to one aspect of the present invention, a system for selecting a frequency for communication within a premises network may include a telephone line interface, a transceiver, and a logic/control unit coupled to both the telephone line interface and the transceiver. The telephone line interface may be operable to couple to a premises network. In some embodiments, the logic/control unit may be operable to select a first channel. The first channel may correspond to a first frequency over which communications may be sent from the transceiver to other devices within the premises network.

30 Claims, 7 Drawing Sheets

300

| SELECTION | CHANNEL ALLOCATION BY CHANNEL NUMBER | | | | | | | |
|---|---|---|---|---|---|---|---|---|
| | TX1 RX1 | TX2 RX2 | TX3 RX3 | TX4 RX4 | TX5 RX5 | TX6 RX6 | TX7 RX7 | TX8 RX8 |
| 1 | 1 | 3 | 6 | 10 | 16 | 27 | 35 | 43 |
| 2 | 1 | 3 | 6 | 10 | 16 | 27 | 35 | 47 |
| 3 | 1 | 4 | 8 | 13 | 21 | 27 | 37 | 48 |
| 4 | 1 | 4 | 8 | 13 | 21 | 32 | 38 | 48 |
| 5 | 1 | 5 | 8 | 13 | 19 | 28 | 38 | 43 |
| 6 | 1 | 5 | 11 | 22 | 30 | 35 | 37 | 44 |
| 7 | 1 | 8 | 12 | 18 | 21 | 31 | 34 | 42 |
| 8 | 1 | 12 | 22 | 28 | 36 | 41 | 45 | 48 |
| 9 | 1 | 13 | 21 | 32 | 38 | 42 | 45 | 47 |
| 10 | 2 | 4 | 7 | 11 | 17 | 28 | 36 | 44 |
| 11 | 2 | 4 | 7 | 11 | 17 | 28 | 36 | 48 |
| 12 | 2 | 6 | 9 | 14 | 20 | 29 | 39 | 44 |
| 13 | 2 | 6 | 12 | 23 | 31 | 36 | 38 | 45 |
| 14 | 2 | 9 | 13 | 19 | 22 | 32 | 35 | 43 |
| 15 | 2 | 14 | 22 | 33 | 39 | 43 | 46 | 48 |
| 16 | 3 | 5 | 8 | 12 | 18 | 29 | 37 | 45 |
| 17 | 3 | 7 | 10 | 15 | 21 | 30 | 40 | 45 |
| 18 | 3 | 7 | 13 | 24 | 32 | 37 | 39 | 46 |
| 19 | 3 | 10 | 14 | 20 | 23 | 33 | 36 | 44 |
| 20 | 4 | 6 | 9 | 13 | 19 | 30 | 38 | 46 |
| 21 | 4 | 8 | 11 | 16 | 22 | 31 | 41 | 46 |
| 22 | 4 | 8 | 14 | 25 | 33 | 38 | 40 | 47 |
| 23 | 4 | 11 | 15 | 21 | 24 | 34 | 37 | 45 |
| 24 | 5 | 7 | 10 | 14 | 20 | 31 | 39 | 47 |
| 25 | 5 | 9 | 12 | 17 | 23 | 32 | 42 | 47 |
| 26 | 5 | 9 | 15 | 26 | 34 | 39 | 41 | 48 |
| 27 | 5 | 12 | 16 | 22 | 25 | 35 | 38 | 46 |
| 28 | 6 | 8 | 11 | 15 | 21 | 32 | 40 | 48 |
| 29 | 6 | 10 | 13 | 18 | 24 | 33 | 43 | 48 |
| 30 | 6 | 10 | 16 | 27 | 35 | 40 | 42 | 49 |
| 31 | 6 | 13 | 17 | 23 | 26 | 36 | 39 | 47 |
| 32 | 7 | 11 | 17 | 28 | 36 | 41 | 43 | 50 |
| 33 | 7 | 14 | 18 | 24 | 27 | 37 | 40 | 48 |

| SELECTION | TX1 RX1 | TX2 RX2 | TX3 RX3 | TX4 RX4 | TX5 RX5 | TX6 RX6 | TX7 RX7 | TX8 RX8 | TX9 RX9 | TX10 RX10 | TX11 RX11 | TX12 RX12 | TX13 RX13 | TX14 RX14 |
|---|---|---|---|---|---|---|---|---|---|---|---|---|---|---|
| 1 | 1 | 3 | 5 | 7 | 11 | 17 | 22 | 26 | 30 | 33 | 34 | 37 | 41 | 49 |
| 2 | 1 | 3 | 5 | 8 | 11 | 22 | 25 | 27 | 30 | 35 | 37 | 42 | 44 | 49 |
| 3 | 1 | 4 | 8 | 15 | 18 | 20 | 25 | 28 | 32 | 35 | 40 | 42 | 45 | 48 |
| 4 | 2 | 4 | 6 | 8 | 12 | 18 | 23 | 27 | 31 | 34 | 35 | 38 | 42 | 50 |
| 5 | 2 | 4 | 6 | 9 | 12 | 23 | 26 | 28 | 31 | 36 | 38 | 43 | 45 | 50 |
| 6 | 2 | 5 | 9 | 16 | 19 | 21 | 26 | 29 | 33 | 36 | 41 | 43 | 46 | 49 |
| 7 | 3 | 6 | 10 | 17 | 20 | 22 | 27 | 30 | 34 | 37 | 42 | 44 | 47 | 50 |

*FIG. 8*

METHOD AND SYSTEM FOR SELECTING A FREQUENCY FOR COMMUNICATION WITHIN A PREMISES NETWORK

RELATED PATENT APPLICATION

This application claims the benefit of U.S. Provisional Application No. 60/138,336, filed Jun. 9, 1999, and entitled "DYNAMIC CHANNEL ALLOCATION AND DEGRADED CHANNELS".

TECHNICAL FIELD OF THE INVENTION

The present invention relates in general to the field of electronic systems, and more particularly to a method and system for selecting a frequency for communication within a premises network.

BACKGROUND OF THE INVENTION

Premises networks may include systems that allow for communication between devices within a user site and devices outside of the user site. A conventional premises network may include a web of wires and/or cables coupled to various electronic devices within the user site. To facilitate external communication, a premises network may be coupled to an external network and, as such, may allow communication between the premises network and devices external to the user site.

One example of a premises network may include the collection of on-site telephone lines associated with a conventional multi-station telephone system. Another example may be the collection of on-site cables associated with a conventional cable television system.

Within the conventional multi-station telephone system, one or more telephone lines may be connected to two or more electronic devices. The system may have a termination point located at the user site that may allow for connection to a central office in a telephone network to provide the user site with one or more telephone lines.

On the user site side, site telephone lines may emanate from the termination point and connect to telephone outlets. In this manner, the telephone outlets may provide access to the telephone line or lines, which may be communicatively coupled to an outside telephone network. Individual telephones and key-sets as well as other electronic devices (e.g., facsimile machines, answering machines, modems, personal computers and peripherals, etc.) may be connected to the telephone outlets and, as such, may be connected to the telephone line or lines. In some systems, these electronic devices may communicate with each other over the premises network. An example of such a system is disclosed in U.S. Pat. No. 5,809,111, entitled "Telephone Control Module and User Site Network and Methods of Operation", issued to Gordon H. Matthews.

In systems that allow communication between premises network devices, problems may arise when communication paths experience carrier degradation or channel loss. Channel degradation and/or loss may occur for a number of reasons including null areas in the transmission path, connected electronic devices that cause broadband attenuation on the line, and high energy outside interference. Unfortunately, most conventional systems do not provide for multi-channel network communications within a premises network. Moreover, conventional techniques for providing such multi-channel communications may substantially interfere with standard telephone line communications.

SUMMARY OF THE INVENTION

In accordance with the present invention, a method and system for selecting a frequency for communication within a premises network are disclosed that provide significant operational advantages.

According to one aspect of the present invention, a system for selecting a frequency for communication within a premises network is provided. The system may include a telephone line interface, a transceiver, and a logic/control unit coupled to both the telephone line interface and the transceiver. The telephone line interface may be operable to couple to a premises network. In some embodiments, the logic/control unit may be operable to select a first channel. The first channel may correspond to a first frequency over which communications may be sent from the transceiver to other devices within the premises network.

A system incorporating teachings of the present invention may be further operable to execute a testing function to determine a first signal strength of the first channel. The system may also be operable to execute a screening function to compare the first signal strength to a signal strength threshold value to determine whether the first channel is adequate or capable of supporting communication.

According to another aspect of the present invention, a system for selecting a frequency for communication within a premises network is provided. The system may include a command module and a telephone control module. The command module (CM) may include a telephone line interface which may be coupled to a premises network. The command module may also include a transmitter operable to transmit network communications to the telephone control module (TCM). The command module may further include a logic/control unit coupled to a telephone line interface and to a transmitter. The logic/control unit may be operable to select a first channel, which corresponds to a first frequency over which network communications may be sent from the transmitter to the telephone control module. The logic/control unit may be further operable to send the first channel selection to the telephone control module.

In some embodiments of the present invention, a telephone control module may include a telephone line interface, which may be coupled to the premises network. The telephone control module may also include an electronic device interface, which may be operable to couple with an electronic device. The telephone control module may also include a receiver operable to receive network communications from a transmitter associated with the CM. The telephone control module may further include a logic/control unit coupled to a telephone line interface associated with the TCM, an electronic device interface associated with the TCM, and a receiver associated with the TCM. The telephone control module may be operable to execute a testing function to determine a first signal strength of the first channel. The telephone control module may also be operable to execute a screening function to compare the first signal strength to a signal strength threshold value to determine whether the first channel is adequate.

According to another aspect of the present invention, a method for selecting a frequency for communication over a premises network is provided. The method includes selecting a first channel which corresponds to a first frequency for communication over a premises network. The method may also include determining a first signal strength of the first channel. The method may further include comparing the first signal strength to a first threshold value to determine the adequacy of the first channel.

According to another aspect of the present invention, a method for maintaining a desired signal strength during communication over a premises network is provided. The method may include selecting a first channel. The first channel may correspond to a first frequency for communication over a premises network. An initial signal strength of the first channel may be determined, and the initial signal strength may be compared to a first threshold value. In some embodiments, signal strength of the first channel may be determined periodically. If the signal strength of the first channel falls below a threshold value, the first channel may be replaced by a second channel.

It is a technical advantage of the present invention that frequencies may be selected for high-integrity network communications within a premises network which do not substantially interfere with standard telephone line communications. It is another technical advantage that several frequencies may be selected such that simultaneous communication at these frequencies does not create an undesirable level of interference.

It is another technical advantage that the signal strength, or integrity, at particular frequencies can be monitored during operation of the system. It is a further technical advantage that frequencies which become degraded can be replaced by high-integrity frequencies.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 7 shows one embodiment of a channel table that may be used in a method for table-based frequency selection in accordance with teachings of the present invention; and FIG. 8 shows a second embodiment of a channel table that may be used in a method for table-based frequency selection in accordance with teachings of the present invention.

DETAILED DESCRIPTION OF THE INVENTION

Figure 1:
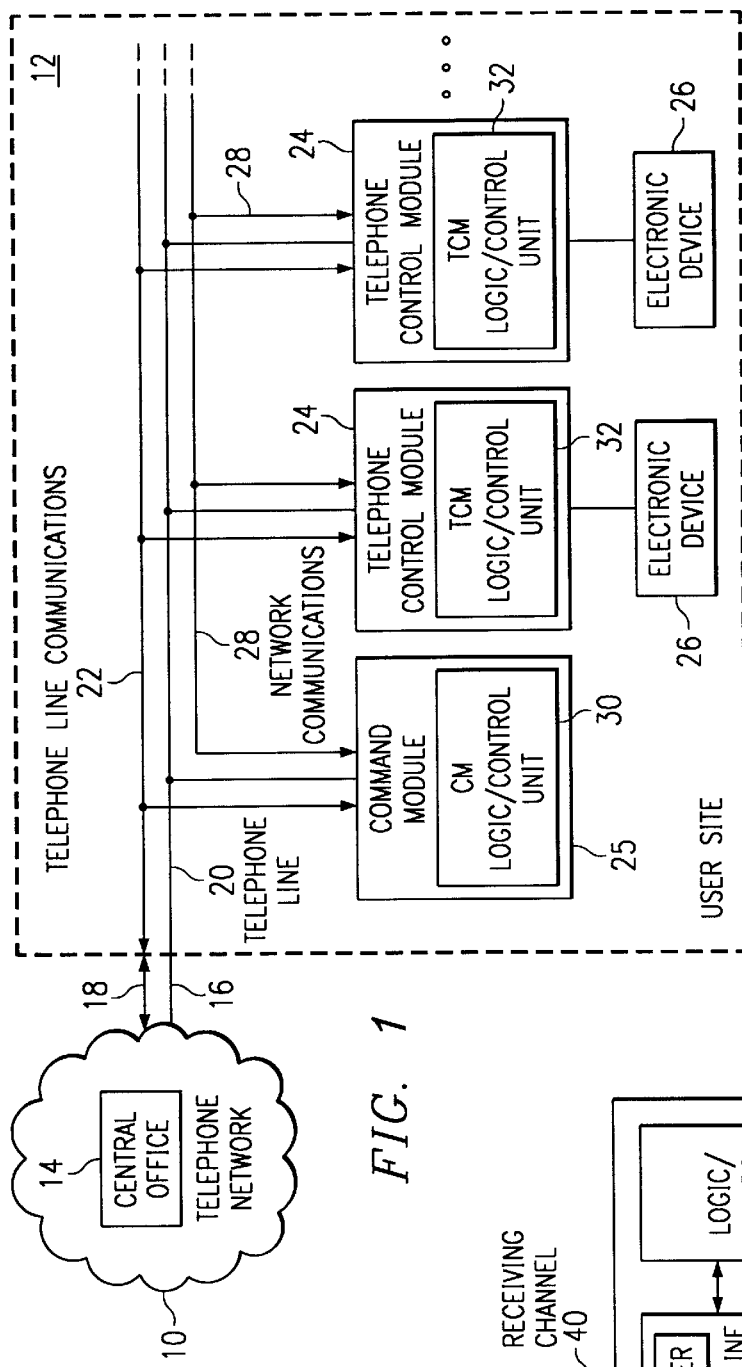
FIG. 1 shows a block diagram of one embodiment of a multi-station telephone system having a module based user site network constructed according to teachings of the present invention.

FIG. 1 depicts a block diagram of one embodiment of a multi-station telephone system having a module based user site network constructed according to the teachings of the present invention.

A telephone network 10 may be coupled to a user site 12. Telephone network 10 may include a central office 14 and may be a local telephone network, cellular network, cable system based telephone network or other network providing telecommunications interconnectively.

Telephone network 10 may be coupled to user site 12 through a telephone line 16. Telephone line 16 supports telephone line communications 18 between telephone network 10 and user site 12. Telephone line 16 may include a combination of copper wire, radio frequency transmissions, or other medium upon or through which telephone line communications 18 may be supported. Telephone line communications 18 may be based upon an ISDN, POTS, or other telephone line communication protocol.

User site 12 may include a site telephone line 20 which may be coupled to telephone line 16. Site telephone line 20 may support telephone line communications 22 in user site 12. Telephone line communications 22 may be based upon an ISDN, POTS or other telephone communication protocol as appropriate for user site 12. Site telephone line 20 may include copper wire, radio frequency transmissions, or other suitable medium upon or through which telephone line communications 22 may be supported.

User site 12 may include a plurality of telephone control modules (TCMs) 24, a plurality of electronic devices 26, and at least one command module 25. Each telephone control module 24 may be coupled to site telephone line 20 and to an electronic device 26. Electronic devices 26 may include telephones, key-sets, facsimile machines, answering machines, modems, personal computers, peripherals, or other electronic devices. Each telephone control module 24 may also include a TCM logic/control unit 32, which may include a memory storage device and a processor.

Each command module 25 may also be coupled to site telephone line 20. Command module 25 may be a telephone control module 24 and may be coupled to an electronic device 26. Command module 25 may include CM logic/control unit 30, which may include a memory storage device and a processor.

Telephone control modules 24 and command modules 25 may communicate with one another via network communications 28 to form a user site network. Network communications 28 may be supported by site telephone line 20, by electric power lines in user site 12, by electromagnetic transmissions, such as radio frequency or infra-red signals, or by other appropriate media.

Network communications 28 may be supported by site telephone line 20 without limiting the operation of electronic devices 26, telephone line communications 22, telephone line communications 18, telephone line 16, central office 14 or telephone network 10. In order to do so, network communications 28 may be implemented using a packet based protocol carried by a modulated high frequency signal communicated across the site telephone line 20.

In operation, telephone control modules 24 and command modules 25 may provide benefits to any system in which a telephone line 16 is connected to two or more electronic devices 26. Telephone control modules 24 and command modules 25 collectively form a user site network to provide control and communication in the multi-station telephone system. In addition, telephone control modules 24 and command modules 25 may implement call processing features for user site 12. Telephone control modules 24 and command modules 25 may be arranged in any appropriate topology to form the user site network. One particular arrangement includes one command module 25 coupled to a plurality of telephone control modules 24 to form the user site network.

Telephone control module 24 and command modules 25 may process incoming and outgoing calls and interact with one another via network communications 28 to provide control, communications, call processing features or other desired functionality. Telephone control modules 24 and command modules 25 may provide, for example, automatic call answering, call forwarding, call transfer, conferencing, voice mail as well as other call processing features. Among a wide range of call processing features telephone control modules 24 and command modules 25 may also use network communications 28 to provide intra site telephone communications between electronic devices 26 without requiring the use of or affecting telephone network 10.

CM logic/control unit 30 and TCM logic/control units 32 may operate, individually or in combination, to control the frequency at which network communications 28 may be communicated across site telephone line 20. Such control over frequency of network communications 28 may include selecting an initial frequency or frequencies of network communications 28 across site telephone line 20, testing the strength or signal quality of network communications 28 at a particular frequency, replacing frequencies of network communications 28 having undesirable signal strength or signal quality, or any other functions in order to obtain and maintain network communications 28 at desired signal strength or signal quality.

The use of telephone control modules 24 and command module 25 to control the frequency of network communications 28 across site telephone line 20 in a multi-station telephone system is a technical advantage of the present invention.

Figure 2:
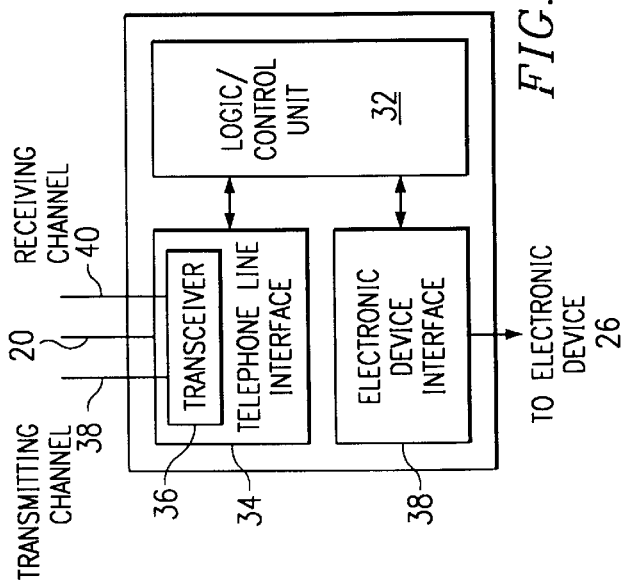
FIG. 2 shows a block diagram of one embodiment of a telephone control module constructed according to teachings of the present invention.

FIG. 2 is a block diagram of one embodiment of a telephone control module 24 constructed according to the teachings of the present invention. As shown, telephone control module 24 is coupled to site telephone line 20 and an electronic device 26. In the embodiment of FIG. 2, telephone control module 24 includes a telephone line interface 34 which is coupled to site telephone line 20 and receives telephone line communications 22 and network communications 28. Telephone line interface 34 may include a transceiver 36 which may receive network communications 28 from or send network communications 28 across site telephone line 20.

Telephone control module 24 may also include a TCM logic/control unit 32 which is coupled to telephone line interface 34. Logic/control unit 32 is also coupled to an electronic device interface 38 which is coupled to an electronic device 26, as shown. In operation, logic/control unit 32 monitors telephone line communications 22 on site telephone line 20 and monitors electronic device 26. Logic/control unit 32 operates to couple electronic device 26 to or isolate electronic device 26 from site telephone line 20. Logic/control unit 32 uses network communication 28 to provide control, communication, and call processing features, including handling incoming and outgoing calls. Network communications 28 allow multiple telephone control modules 24 and command modules 25 to create a user site network.

Logic/control unit 32 further operates to monitor network communications 28 on site telephone line 20 and sent from or received by transceiver 36.

In one embodiment of the present invention, logic/control unit 32 may select a transmitting channel 38 corresponding to a particular frequency at which transceiver 36 may transmit network communications 28 across site telephone line 20, and receiving channel 40 corresponding to another frequency at which transceiver 36 may receive network communications 28 across site telephone line 20. Logic/control unit 32 may also monitor network communications 28 across transmitting channel 38 and receiving channel 40. Logic/control unit 32 may detect the signal strength, signal quality, or interference of network communications 28 across transmitting channel 38 and receiving channel 40, and may replace either or both of transmitting channel 38 and receiving channel 40 if undesirable signal strength, signal quality, or interference are detected. Logic/control unit 32 may also be operable to periodically monitor the signal strength, signal quality, or interference of network communications 28 across transmitting channel 38 and receiving channel 40 during communications across site telephone line 20, and may replace such channels with channels corresponding to different frequencies in order to maintain a desired strength or quality of network communications 28 across site telephone line 20.

Figure 3:
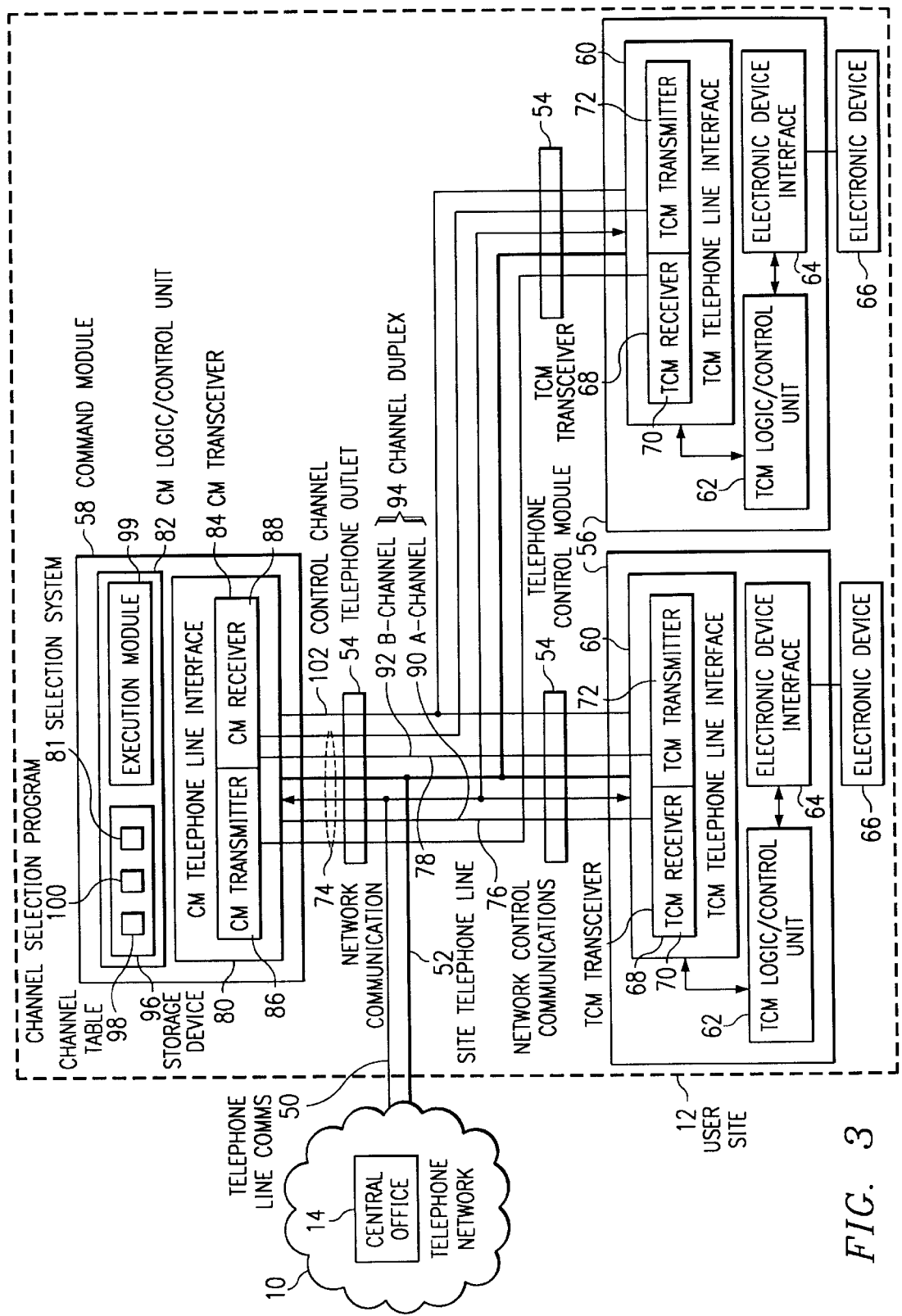
FIG. 3 shows a block diagram of one embodiment of a multi-station telephone system having a device for selecting a frequency for communication within a premises network according to teachings of the present invention.

FIG. 3 is a block diagram of one embodiment of a multi-station telephone system having a device for selecting a frequency for communication within a premises network according to the teachings of the present invention. As shown, telephone network 10 is coupled to user site 12. Telephone network 10 may include a central office 14 that provides tip and ring signals across a telephone line to user site 12.

In user site 12, telephone line communications 50 are carried over site telephone line 52 is coupled to central office 14 and extends to a plurality of telephone outlets 54. Telephone outlets 54 may include standard RJ-11 wall outlets. Each telephone outlet 54 may be coupled to a telephone control module 56 or a command module 58, as shown.

Each telephone control module 56 may include a TCM telephone line interface 60, a TCM logic/control unit 62, and an electronic device interface 64. TCM telephone line interface 60 provides an interface to a telephone outlet 54, and electronic device interface 64 provides an interface to an electronic device 66. In the illustrated embodiment, electronic device 66 comprises a standard telephone.

Each TCM logic/control unit 62 is operable to monitor its corresponding telephone outlet 54 and to control its corresponding line interface 60. Each TCM logic/control unit 62 is also operable to control its corresponding electronic device interface 64. TCM telephone line interface 60 may include a TCM transceiver 68, which includes a TCM receiver 70 and a TCM transmitter 72. In another embodiment of the present invention, TCM transceiver 68 is located within TCM logic/control unit 62.

Command module 58 and telephone control modules 56 may communicate with each another via network communications 74 to provide control, communications, call processing features or other desired functionality. In the embodiment shown in FIG. 3, network communications 74 includes network control communications 76 and 78. Using network communications 74, command modules 58 and telephone control modules 56 may provide, for example, automatic call answering, call forwarding, call transfer, conferencing, voice mail as well as other call processing features. Telephone control modules 56 and command modules 58 may also use network communications 74 to provide intra site telephone communications between electronic devices 66 without requiring the use of or affecting telephone network 10.

Network communications 74 can be supported by site telephone line 53 without limiting the operation of electronic devices 66, telephone line communications 50, central office 14 or telephone network 10. In order to do so, network communications 74 can be carried at a frequency outside of the frequency band used by the telephone companies for standard calls.

In operation, TCM receiver 70 is operable to receive network control communications 76 communicated across site telephone line 52, and to communicate these received communications to TCM logic/control unit 62. TCM logic/control unit 62 is operable to utilize TCM transmitter 72 to communicate network control communications 78 across site telephone line 52.

Command module 58 may include a CM telephone line interface 80 coupled to a CM logic/control unit 82. CM telephone line interface 80 provides an interface to a telephone outlet 62. CM logic/control unit 82 is operable to monitor telephone outlet 54 and to control CM telephone line interface 80.

CM telephone line interface 80 can comprise a CM transceiver 84, which includes a CM transmitter 86 and a CM receiver 88. CM receiver 88 is operable to receive network control communications 76 communicated across site telephone line 52, and communicate these communications to CM logic/control unit 82. CM logic/control unit 82 is operable to utilize CM transmitter 86 to send network control communications 78 across site telephone line 52.

It should be understood that CM receiver 88 and each TCM receiver 70 may be operable to receive any network communications 74 from any CM transmitter 86 or TCM transmitter 72 including, but not limited to, network control communications 76 and 78. Similarly, CM transmitter 86 and each TCM transmitter 72 may be operable to send network communications 74 to any CM receiver 84 of TCM receiver 70 including, but not limited to, network control communications 76 and 78. Thus, CM transceiver 68 and the plurality of TCM transceivers 68 create a network whereby CM logic/control unit 82 and each TCM logic/control unit 62 may communicate with any other logic/control unit 70 or 82 within user site 12.

The user site network established by network communications 74 may be used to provide various control, communication, and call processing features for a multi-station telephone system located at user site 12. These features may be provided to a single-line or multiple-line multi-station telephone system having multiple telephones or key-sets as found in many small businesses. For example, incoming telephone calls may be answered and processed by command module 58, and out going telephones may be processed and placed by command module 58. Command module 58 may also communicate with telephone control modules 56 to provide bridging between multiple telephone lines, call forwarding, voice mail, conferencing, and other desired call processing features. It should be understood that numerous control, communication, and call processing features may be implemented using command module 58 and telephone control module 56 as well as using telephone control modules and other network configurations.

In order for command module 58 and telephone control modules 56 to perform these various features, network communications 74 must be supported by site telephone line 52 without limiting the operation of telephone line communications 50, central office 14 or telephone network 10. In order to do so, network communications 74 may be carried by a modulated high frequency signal communicated across site telephone line 52.

In one embodiment, command module 62 includes a selection system, indicated generally at 81, to overcome degradation of or loss of signal strength of network communications 74 across site telephone line 52. Selection system 81 may include a frequency hopping scheme operable to select particular frequencies at which degradation or loss of signal strength of network communications 74 may be minimized. Selection system 81 may also be operable to monitor ongoing network communications 74 and utilize a frequency hopping scheme to select new frequencies at which network communications 74 which have lost integrity or become degraded may be carried. Selection system 81 is operable such that network communications 74 and telephone line communications 50 may continue during frequency hopping by selection system 81.

It should be understood that in alternative embodiments, selection system 81 may be located within command module 58, within one or more telephone control modules 56, or spread among a number of command modules 58 and/or telephone control modules 56.

In one embodiment, selection system 81 comprises an execution module 99 coupled to a storage device 96. Execution module 99 may comprise, for example, a microprocessor. Storage device 96 comprises a device operable to store digital data. For example, storage device 96 may include, among others, a read only memory (ROM) device, a read access memory (RAM) device, any derivative of ROM or RAM, or a magnetic storage device such as a hard disk drive. One or more channel tables 98 may be stored in storage device 96. Each channel table 98 may comprise an array of channels, each corresponding to a particular frequency within the rage of frequencies. Examples of possible channel tables 98 are illustrated by FIG. 7 and FIG. 8.

Selection system 81 may also comprise a channel selection program 100, which may be stored in storage device 96. Channel selection program 100 may be executed by execution module 99, in order to select channels for network communications 74. In the embodiment shown in FIG. 3, channel selection program 100 may select an A-channel 90 over which network control communications 76 may be sent from CM transmitter 86 to TCM receiver 70, and a B-channel 92 over which network control communications 78 may be sent from TCM transmitter 72 to CM receiver 88. Together, A-channel 90 and B-channel 92 create a channel duplex 94.

A-channel 90 and B-channel 92 each correspond to unique frequency within a frequency band. In one embodiment, the frequency band is above the 100 Hz to 4,000 Hz range used by local telephone companies. In a particular embodiment, the frequency band ranges from 1.70 MHz to 4.15 MHz.

In operation, once A-channel 90 and B-channel 92 are selected by channel selection program 100, CM logic/control unit 82 sets CM transmitter 86 to transmit network communications 74 at the frequency corresponding to A-channel 90, and sets CM receiver 88 to receive network communications 74 at B-channel 92. CM logic/control unit 82 also communicates the A-channel 90 and B-channel 92 selections to telephone control module 56. The selections may be sent from CM transceiver 84 to TCM transceiver 68 via a control channel 102. In one embodiment, control channel 102 is supported by site telephone line 52 such that control channel 102 allows communication between CM transceiver 84 and TCM transceiver 68 at a particular frequency. In a particular embodiment, this frequency is 341 kHz. In other embodiments, control channel 102 may supported by electric power lines in user site 12, by electromagnetic transmissions (i.e. radio frequency or infra-red signals) A or by another appropriate medium.

TCM logic/control unit 62 then sets TCM receiver 70 to receive network communications 74 at the frequency corresponding to A-channel 90, and sets TCM transmitter 72 to transmit network communications 74 at the frequency corresponding to B-channel 92. Command module 58 and/or telephone control module 56 then determine the signal strength associated with A-channel 90 and B-channel 92.

In one embodiment of the present invention, a Carrier Detect function is used to determine the signal strength of A-channel 90 and B-channel 92. Carrier Detect may be performed inside CM transceiver 84 and/or TCM transceiver 68 to determine whether the signal strength of a particular channel exceeds a programmable threshold value. Carrier detect is a logic level output of a receiver 70 or 88, depending on whether the carrier detect function is performed in telephone control module 56 or command module 58, respectively, that is asserted when the signal strength of a particular channel exceeds a threshold value. The threshold value may be programmable. In one embodiment, the carrier detect includes a processor which may program the threshold value over a 32 dB range in 1 dB increments.

In another embodiment, the signal strength of A-channel 90 and B-channel 92 are determined using a Received Signal Strength Indicator, which is an analog voltage output that is directly proportional to the log of the signal strength level. This voltage output may then be compared to a threshold value, such as by using a Carrier Detect comparitor. It should be understood that other methods may be used to determine the signal strengths of A-channel 90 and B-channel 92, and to compare these signal strengths with a threshold value.

In one embodiment of the present invention, the determination of the signal strengths of A-channel 90 and B-channel 92 is performed within command module 58. In another embodiment, this determination is performed within telephone control module 56. And yet another embodiment, command module 58 and telephone control module 56 function together to make this determination. In these later two embodiments, information regarding the signal strength of A-channel 90 and B-channel 92 may be communicated between telephone control module 56 and command module 58 via control channel 102.

If it is determined that the signal strength of A-channel 90 or B-channel 92 is lower than the threshold value, then a replacement channel or channels to replace A-channel 90 and/or B-channel 92 is/are selected. This process is repeated until it is determined that the signal strength of A-channel 90 and/or B-channel 92, or replacement channels selected by channel selection program 98 are equal to or greater than the threshold value. At this point, a voice path will be established between command module 58 and telephone control module 56 using channels with acceptable signal strength levels.

Figure 4:
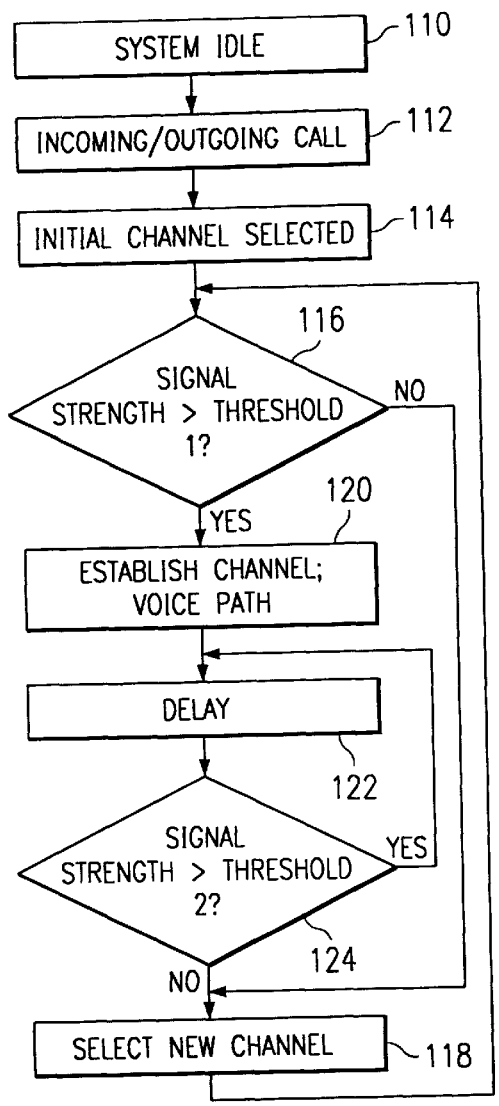
FIG. 4 depicts a flowchart of one embodiment of a method for selecting channels and maintaining integrity of network communications within a premises network according to teachings of the present invention.

FIG. 4 is a flowchart of one embodiment of a method of selecting channels and maintaining integrity of network communications within a premises network according to the teachings of the present invention. In one embodiment, the method of FIG. 4 is implemented by a command module. In another embodiment, the method of FIG. 4 is implemented using at least one command module and at least one telephone control module.

In step 110, the user site network is an idle state where no incoming call, outgoing call or non-call based call processing feature is in progress. In step 112 it is determined whether an incoming call, an outgoing call, or a non-call based call processing feature is detected. In one implementation, this step is accomplished by a command module. In another implementation, this step is accomplished by a telephone control module.

If an incoming call, an outgoing call, or a non-call based call processing feature is detected, an initial channel or channels are selected at step 114 to support communication between command modules and telephone control modules to provide various control, communication, and call processing features for a multi-station telephone system. In one implementation, the initial channel or channels are selected by a command module. In another implementation, the initial channel or channels are selected by a command module. In another implementation, the initial channel or channels are selected by a telephone control module. In step 116, the signal strength of each of the initial channels is determined and compared to a first threshold value. In one implementation, this determination and comparison is performed by a command module. In another implementation, this determination and comparison is performed by a telephone control module.

If it is determined that the signal strength of any of the initial channels is less than the first threshold value then a new channel or channels are selected to replace the weak channels at step 118. In one implementation, if it is determined that the signal strength of any of the initial channels is less than the first threshold value, all of the initial channels are replaced by new channels. After the new channel or channels have been selected at step 118, the network returns to step 116 to test the signal strength of each of the current channels against the first threshold value.

Steps 116 and 118 are repeated until the signal strength of each of current channels is greater than the first threshold value, at which point a voice path is established along at least one of the current channels at step 120.

Steps 122 and 124 periodically monitor the integrity of the current channels. After a predetermined delay at step 122, the signal strength of each of the current channels is compared against a second threshold value at step 124. The second threshold value may be less than equal to or greater than the first threshold value. If it is determined in step 124 that the signal strength of each current channel is equal to or greater than the second threshold value, the network returns to step 122. If, on the other hand, the signal strength of any of the current channels is less than the second threshold value, a new channel or channels is selected to replace the weak channel or channels at step 118. In one implementation, if the signal strength of any of current the channels is less than the second threshold value, all of the current channels must be replaced by new channels at step 118.

By periodically monitoring the integrity of the network communication channels at steps 122 and 124, and by replacing weak or degraded channels at step 118, network communications between command modules and telephone control modules may be maintained at a desired signal strength.

Figure 5:
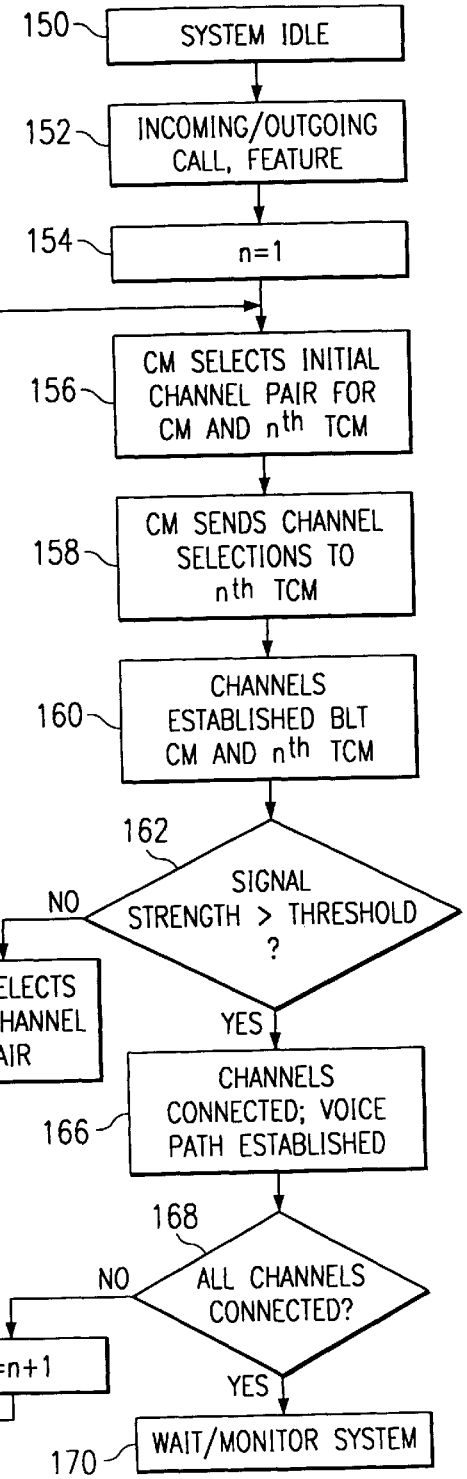
FIG. 5 depicts a flowchart of one embodiment of a method for selecting multiple channels for network communications according to the teachings of the present invention.

FIG. 5 is a flowchart of one embodiment of a method of selecting multiple channels for network communications within a premises network according to the teachings of the present invention. Using this method, a communications network consisting of a command module and several telephone command modules may be established.

In step 150, the user site network is an idle state where no incoming call, outgoing call or non-call based call processing feature is in progress. In step 152 an incoming call, an outgoing call, or a non-call based call processing feature is detected. In one implementation, this step is accomplished by a command module. In another implementation, this step is accomplished by a telephone control module.

In step 154, a telephone control module counter, n, is set to 1. It is important to understand that the telephone control module counter is used in FIG. 5 only for illustrative purposes to show how the command module may connect to several telephone control modules. In other words, the implementation of FIG. 5 may not include an actual telephone control module counter.

If an incoming call, an outgoing call, or a non-call based call processing feature is detected, a command module selects an initial pair of channels at step 156 to support communications between the command module and the $n^{th}$ telephone control module to be connected, in order to provide various control, communication, and call processing features for the multi-station telephone system. Each channel may correspond to a particular frequency within a range of frequencies. A pair of channels may be used for communication between the command module and the each telephone control module such that one channel supports communication from the command module to the telephone control module, and the other channel supports communication from the telephone control module to the command module. In other implementations of the present invention, only one channel or more than two channels may be used to communicate between the command module and each telephone control module.

The command module may select the initial pair of channels by any appropriate method. In one implementation, the command module selects an initial pair of channels that are statistically likely to have good signal strengths, allowing communication with minimal interference or degradation. For example, the command module may select the initial pair of channels by the method described with reference to FIG. 6 below.

After making the initial channel selections in step 156, the command module sends these selections to $n^{th}$ telephone control module in step 158. The command module may send these selections via a control channel, which may be supported by a telephone line, electric power lines in user site, electromagnetic transmissions (i.e. radio frequency or infrared signals) or by another appropriate medium.

In step 160, the command module and the $n^{th}$ telephone control module are set to communicate with each other over the selected channels, or in other words, at the frequencies corresponding to the selected channels. Steps 158 and 160 may be performed in reverse order or simultaneously. For example, in one embodiment, the command module is set to receive network communications over a first channel and send network communications over a second channel, then the channel selections are communicated to the telephone control module, and then the telephone control module is set to receive network communications over the second channel and send network communications over the first channel.

In step 162, the signal strength of each of the initial channels is determined and compared to a threshold value. In one implementation, this determination and comparison is performed by the command module. In a particular implementation, steps 158 and 160 are eliminated, whereby the command module selects the initial channels at step 156 and then determines the signal strengths of the channels at step 162. In another implementation, the determination and comparison is performed by the telephone control module.

In yet another implementation, the command module and the telephone control module work together to perform these functions. For example, the command module may determine the signal strength of one of the channels and the telephone control module may determine the signal strength of the other.

If it is determined that the signal strength of either of the initial channels is less than the threshold value then a new channel or channels are selected by the command module to replace the weak channels at step 164. In one implementation, if it is determined that the signal strength of either of the initial channels is less than the first threshold value, only that channel is replaced by a new channel. In another implementation, both channels are replaced by new channels. After the new channel or channels have been selected at step 164, the system returns to step 158 to send the new channels selection or selections from the command module to the $n^{th}$ telephone control module.

Steps 158 through 164 are repeated, until it is determined that the signal strength of each channel connecting the command module and the $n^{th}$ telephone control module is greater than the threshold value, at which point a voice path is established along at least one of the current channels at step 166.

At step 168, the network determines whether additional telephone control modules need to be connected to the command module for network communications. If so, the system waits at step 170 for another incoming call, outgoing call, or non-call based call processing feature to be detected which would require communication with an additional telephone control module or modules. Additionally at step 170, the system may monitor the signal strength of the channels which are currently in use for degradation or loss of integrity, such as described with respect to steps 112 and 114 of the implementation illustrated in FIG. 4 above.

If it is determined that an additional telephone control module or modules do need to be connected to the command module for network communications, the illustrative telephone control module counter is increased by one in step 172, and the system returns to step 156, where the command module selects an initial pair of channels for communication between the command module and the $n^{th}$ telephone control module. For example, if after establishing channels for communication between the command module and the first telephone control module at steps 156 through 166, it is determined at step 168 that channels must be established for communication with a second telephone control module, the telephone control module counter n becomes 2 at step 172, and system returns to step 156 to begin establishing channels for communication between the command module and the second telephone control module. This process is repeated until it is determined that no additional telephone control modules need to be connected to the command module for network communications, at which the system advances to step 170 as described above.

Figure 6A:
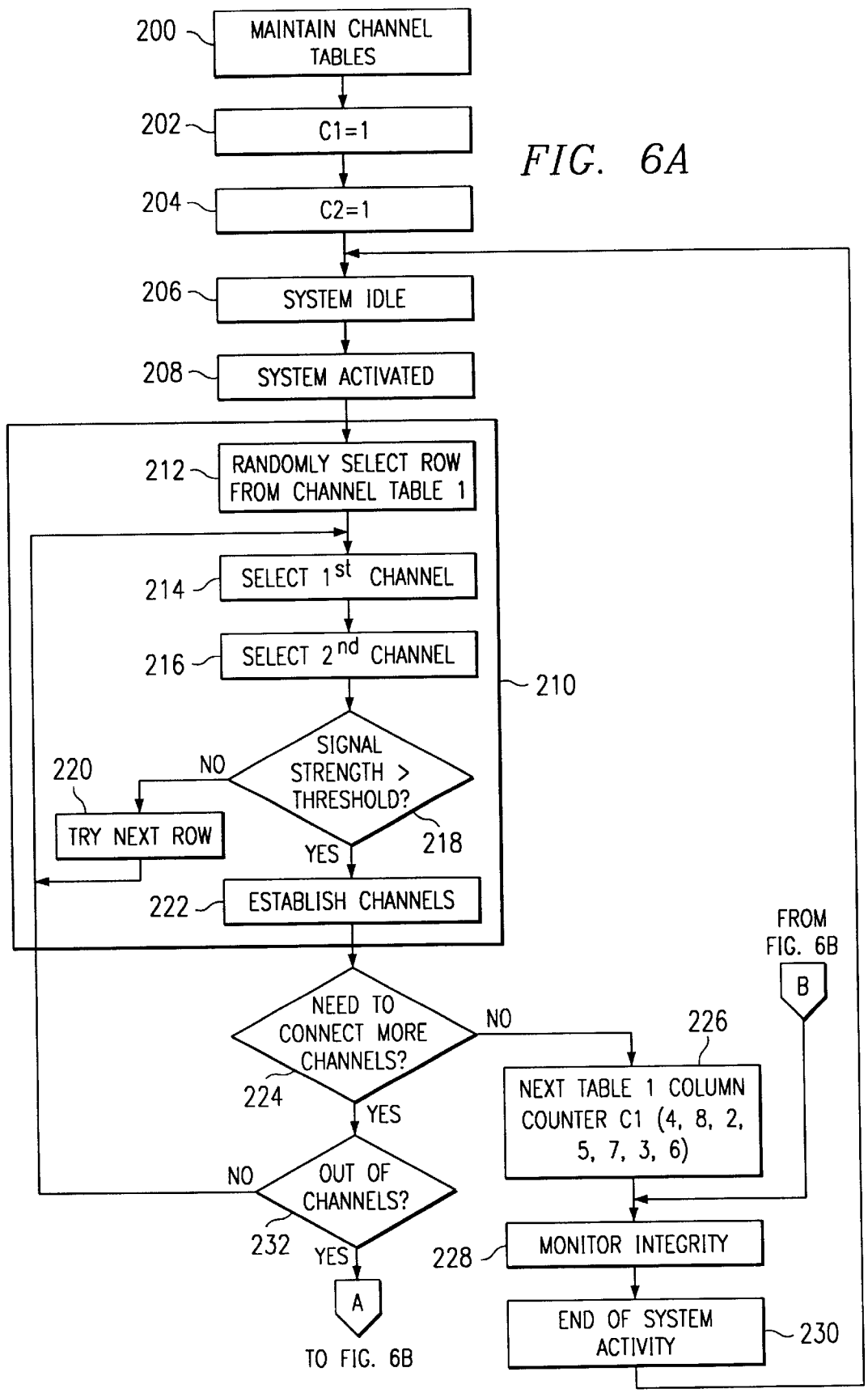
FIGS. 6A and 6B depict a flowchart of one embodiment of a method for table-based channel selection within a premises network according to teachings of the present invention.
Figure 6B:
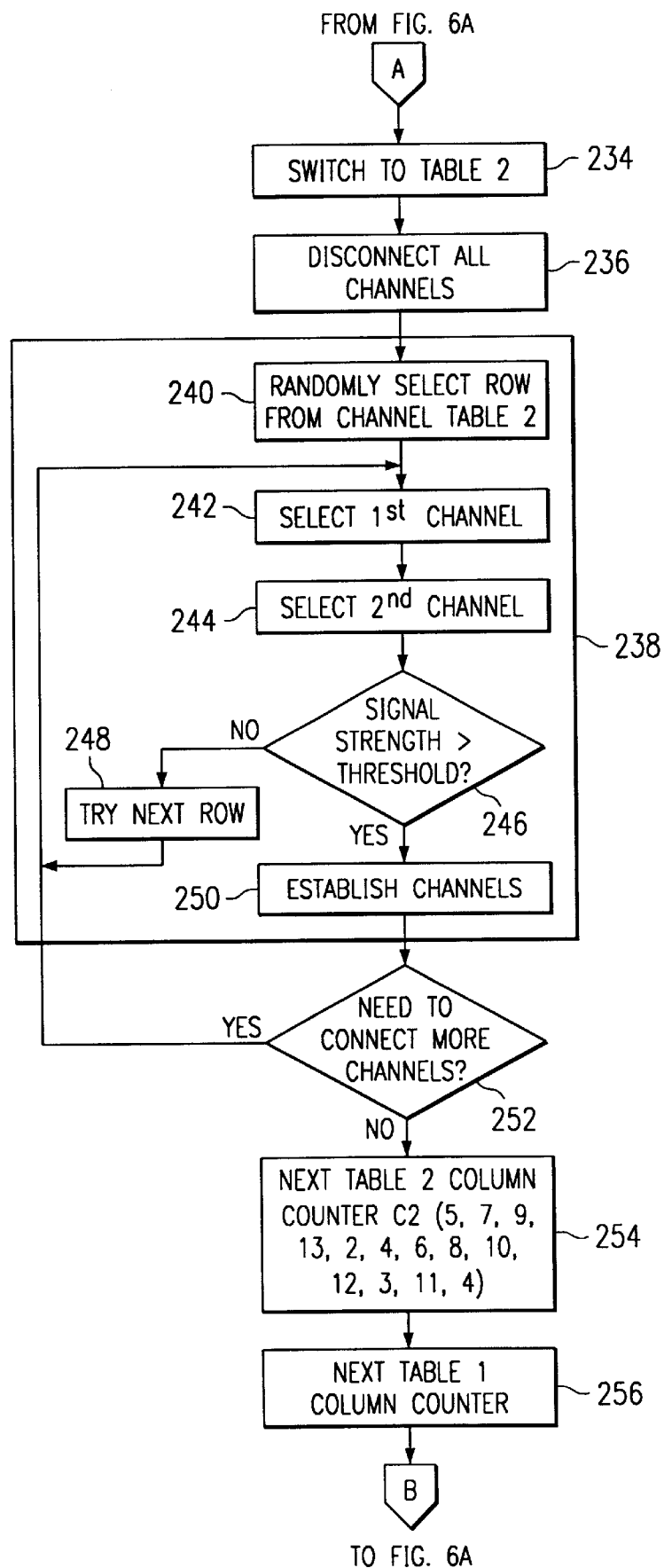

FIGS. 6A and 6B are flowcharts of one embodiment of a method of table implemented channel selection for communication within a premises network according to the teachings of the present invention. This method may be used to select channels having desired signal strengths or integrity from a table or tables of channels, each corresponding to a particular frequency within a range of frequencies.

At step 200, a number of channel tables are maintained. Such tables may include, for example, the two dimensional tables as illustrated in FIGS. 7 and 8. For illustration, the table shown in FIG. 7 will be referred to as Table 1, and the table shown in FIG. 8 will be referred to as Table 2.

At step 202, a Table 1 column counter, c1, to be used in the selection of channels from Table 1, is set to 1. Similarly, at step 204, a Table 2 column counter, c2, to be used in the selection of channels from Table 2, is set to 1.

At step 206, the telephone network is an idle state where no incoming call, outgoing call or non-call based call processing feature is in progress. In step 208 an incoming call, an outgoing call, or a non-call based call processing feature is detected.

At step 210, a pair of channels which can support network communications at a desired signal strength or integrity are selected from Table 1. At step 212 an initial row is randomly selected from all of rows of Table 1. For illustration, this row may be designated row X. Each row in each channel table comprises a number of channels corresponding to particular frequencies which have been determined to minimally interfere with each other. Thus, it is possible to simultaneously communicate at every frequency corresponding to the channels on any table row with little interference. Since each row of Table 2 comprises more channels than each row of Table 1, selecting channels from Table 2 will allow a larger number of simultaneous communications. Thus, for example, Table 2 can be used to support a system having more telephone control modules than could Table 1. However, since the channels in each row of Table 1 may cause less interference with each other than those in Table 2 (since channels in Table 1 may be spaced further apart within a particular frequency band than those in Table 2, for example) it may be desirable to use Table 1 if possible.

At step 214, the channel located in row X, column c1 of Table 1 is selected as the initial first channel. At step 216, the channel located in row X, column c1+1 is selected as the initial second channel.

At step 218, the signal strengths of the initial first and second channels are determined. In one implementation, the signal strengths of the initial first and second channels are compared to a threshold value set to differentiate acceptable, or "good," channels from unacceptable, or "bad," channels.

If it is determined at step 218 that the signal strength of either of the initial channels is less than the threshold value, i.e. at least one of the channels is bad, step 220 directs the system to return to steps 214 and 216 to select two new channels from the next row of Table 1. Thus, the channel located at row X+1, column c1 will be the new first channel, and the channel located at row X+1, column c1+1 will be the new second channel.

Steps 214 through 220 are repeated until it is determined at step 218 that the signal strength of each of the two channels is greater than the threshold value, i.e. when two "good" channels are found. At step 222, the two good channels are locked in and network communications, such as voice data, may be established over the channels.

After the first pair of channels are selected and established at step 210, the system determines at step 224 whether more channels must be selected, such as for communicating with additional modules within the multi-station system, such as a telephone control module. If it is determined at step 224 that no more channels need to be selected, the system proceeds to steps 226 through 230.

At step 226, the value of the Table 1 column counter, c1, is advanced to the next value in a selection order sequence. For example, the selection sequence may be 1, 4, 8, 2, 5, 7, 3, 6. Rotating the column counter in this way causes the system to choose the initial channels from different columns at steps 214 and 216 following system idle conditions. Thus, by randomly selecting rows at step 212, and by rotating the columns from which initial channels are selected, it is possible to avoid selecting the same initial channels after consecutive system idle conditions. This randomization process is important to avoid the system repeatedly attempting to establish communications on the same bad channel, since particular channels may be bad on a regular basis.

At step 228, the system may monitor the established channels for degradation or loss of integrity, and may replace "bad" channels with acceptable channels, as described with respect to steps 112 and 114 of FIG. 4. At step 230 the channels are disconnected, at the end of a call, for example, and the system returns to an idle condition at step 206.

Returning to step 224, if it is determined that additional channels for communication must be selected, the system determines at step 232 whether there are any unused channels on the row of Table 1 from which the established channels were selected. To illustrate, one embodiment of the present invention uses Table 1 and uses a pair of channels, known as a duplex channel, for communication between any two modules, such as a command module and a telephone control module. Since Table 1, as shown in FIG. 7, has four duplex channels (i.e. eight channels) per row, Table 1 can be used to select channels for up to four module-to-module connections at any one time. For example, Table 1 can be used to select channels for simultaneous communication between a command module and four telephone control modules.

If it is determined at step 232 that there are unused channels on the row from which the established channels were selected, the system returns to steps 214 through 222 to select and establish two more "good" channels. This process of selecting more channels is repeated until it is determined at step 224 that no more channels need to be selected, or until it is determined at step 232 that there are no unused channels on the relevant row of Table 1. If the latter determination is made, the system will switch over to Table 2 at step 234. In the implementation using Table 1 and duplex channels for communication, for example, it would be necessary to switch to Table 2 for a command module to simultaneously communicate, at different frequencies, with five or more telephone control modules, since Table 2 includes more channels per row than Table 1, thus supporting more simultaneous communications.

To switch from Table 1 to Table 2, all established channels may be disconnected at step 236. Then the first pair of channels (i.e. the first duplex channel) which can support network communications at the desired signal strength is selected from Table 2 at step 238, similar to the selection of channels from Table 1 at step 210. Steps 240 through 250 are similar to corresponding steps 212 through 222, except the channel pairs are selected from Table 2 rather than Table 1, and the Table 2 column counter is used rather than the Table 1 column counter.

At step 252, similar to step 224, it is determined whether more channels must be selected for communication within the multi-station system. If it is determined at step 252 that no more channels need to be selected, the system proceeds to steps 254 and 256. At step 254, identical to step 226, the value of the Table 1 column counter, c1, is advanced to the next value in a selection order sequence. At step 256, the value of the Table 2 column counter, c2, is similarly advanced to the next value in another selection order sequence. For example, the selection sequence for the Table 2 column counter may be 1, 5, 7, 9, 13, 2, 4, 6, 8, 10, 12, 3, 11, 14. Again, rotating the column counters in this way minimizes the chances of the system repeatedly choosing a particular "bad" channel to begin its selection process.

At step 228, the system may monitor the established channels for degradation or loss of integrity, and may replace "bad" channels with acceptable channels, as described with respect to steps 112 and 114 of FIG. 4. At step 230 the channels are disconnected, at the end of a call, for example, and the system returns to an idle condition at step 206.

FIG. 7 is one embodiment of a channel table, indicated generally at 300, used by a method for table implemented frequency selection, such as the method described in accordance with FIGS. 6A and 6B. Channel table 300 comprises a two dimensional array 302 of channels 304. Each channel 304 corresponds to a particular frequency within a channel frequency band. The channel frequency band may be above the frequency band used by local telephone companies, from 100 Hz to 4,000 Hz. The channels may be evenly spaced within the channel frequency band. For example, one embodiment includes 50 channels 304 within a channel frequency band ranging from 1.70 MHz to 4.15 MHz. The channels 304 are spaced 50 kHz apart; thus, channel 1 is at 1.70 MHz, channel 2 is at 1.75 MHz, channel 3 is at 1.80 MHz, and so on.

In the embodiment of FIG. 7, array 302 comprises eight columns and 33 rows, each row forming a channel group 306. The channels 304 are arranged such that simultaneous communication over all the channels within any channel group 306 causes minimal interference. Thus, using channel group (i.e. row) 13 to illustrate, communication over channel 23 would not interfere with simultaneous communication over channels 2, 6, 12, 31, 36, 38, and 45.

In operation, a frequency selection method, such as described with reference to FIG. 6, may be used to select up to eight channels for simultaneous communication between modules in a multi-station premises network. If more than eight channels are needed, or if there are not enough "good" channels in any channel group 306 of channel table 300, a channel table having larger channel groups may be used, as illustrated in FIG. 8.

FIG. 8 is another embodiment of a channel table, indicated generally at 310, used by a method for table implemented frequency selection, such as the method described in accordance with FIG. 6. As with channel table 300, channel table 310 comprises a two dimensional array 312 of channels 314, each channel 314 corresponding to a particular frequency within a channel frequency band. The channel frequency band used for channel table 310 may be the same as the band used for channel table 300. Also, channels 314 may correspond to the same frequencies as channels 304.

In the embodiment of FIG. 8, array 312 comprises 14 columns and seven rows, each row forming a channel group 314. As with channel table 300, the channels 314 are arranged in channel table 310 such that simultaneous communication over all the channels within any channel group causes minimal interference. Since each channel group 314 of channel table 310 is larger than each channel group 304 of channel table 300, more channels may be allocated for simultaneous communication. In the embodiment of FIG. 8, up to 14 channels may be selected for simultaneous communication between modules in a multi-station premises network. Thus, channel table 310. may be needed where more than eight channels must be used by the multi-station network.

Although the present invention has been described in detail, it should be understood that various changes, substitutions and alterations can be made thereto without departing from the spirit and scope of the invention as defined by the appended claims.

What is claimed is:

1. A system for selecting a frequency for communication within a premises network, the system comprising:
   a command module and a telephone control module, wherein the command module comprises:
      a command module telephone line interface operable to be coupled to a premises network;
      a command module transmitter operable to transmit network communications to the telephone control module; and
      a command module logic/control unit coupled to the command module telephone line interface and the command module transmitter, the command module logic/control unit operable to select a first channel corresponding to a first frequency over which network communications may be sent from the command module transmitter to the telephone control module, and further operable to send the first channel selection to the telephone control module; and
   wherein the telephone control module comprises:
      a telephone control module telephone line interface operable to be coupled to the premises network;
      a telephone control module electronic device interface operable to be coupled to an electronic device;
      a telephone control module receiver operable to receive network communications transmitted by the command module transmitter; and
      a telephone control module logic/control unit coupled to the telephone control module telephone line interface, the telephone control module electronic device interface and the telephone control module receiver, the telephone control module operable to:
         execute a testing function to determine a first signal strength of the first channel; and
         execute a screening function to compare the first signal strength to a signal strength threshold value to determine the adequacy of the first channel.

2. The system of claim 1, wherein the testing function and the screening function are performed by a carrier detect system.

3. The system of claim 1, wherein the testing function is a performed by a received signal strength indicator.

4. The system of claim 3, wherein the command module logic/control unit further comprises a command module data storage device having a first channel table and a second channel table stored thereon, the first channel table comprising a first array of channels and the second channel table comprising a second array of channels;
   wherein each row of the first channel table form a first channel set, and each row of the second channel table forms a second channel set;
   wherein each second channel set includes a larger number of channels than each first channel set; and
   wherein the first channel is selected from the first channel table if a sufficient number of channels in a particular first channel set are available, and otherwise is selected from the second channel table.

5. The system of claim 1, wherein the telephone control module receiver further includes a carrier detect operable to perform the testing function.

6. The system of claim 1, wherein the telephone control module receiver further includes a received signal strength indicator operable to perform the testing function.

7. The system of claim 1, wherein the testing and screening functions are performed by the telephone control module logic/control unit.

8. The system of claim 1, wherein the command module telephone line interface, the command module transmitter, the telephone control module telephone line interface, and the telephone control module receiver are operable to be coupled to a site telephone line within a premises network.

9. The system of claim 8, wherein the electronic device is a telephone.

10. The system of claim 1, wherein the first channel selection is sent from the command module to the telephone control module via a control channel communicatively coupling the command module and the telephone control module.

11. The system of claim 1, wherein the command module logic/control unit further comprises a command module data storage device having a channel table stored thereon, the channel table comprising an array of channels, wherein each channel corresponds to a frequency within a frequency range; and wherein the first channel is selected from the channel table.

12. The system of claim 11, wherein each row of channel table forms a channel set, each channel set being predetermined such that communication over one channel within a particular channel set does not substantially interfere with simultaneous communication over other channels within that channel set.

13. The system of claim 11, wherein the frequency range is above 4 kHz.

14. The system of claim 11, wherein the frequency range is from 1.70 MHz to 4.15 MHz.

15. The system of claim 1, wherein the command module further comprises a command module receiver and the telephone control module further comprises a telephone control module transmitter.

16. The system of claim 15, wherein the command module logic/control unit further comprises a command module data storage device having a channel table stored thereon, the channel table comprising an array of channels stored thereon, wherein each channel corresponds to a frequency within a frequency range; and wherein the first and second channels are selected from the same row in the channel table.

17. The system of claim 15, wherein each row of channel table forms a channel set, each channel set being predetermined such that communication over one channel within a particular channel set does not substantially interfere with simultaneous communication over other channels within that channel set.

18. The system of claim 15, wherein the frequency range is above 4 kHz.

19. The system of claim 15, wherein the command module logic/control unit further comprises a command module data storage device having a first channel table and a second channel table stored thereon, the first channel table comprising a first array of channels and the second channel table comprising a second array of channels;

wherein a row of the first channel table forms a first channel set, and a row of the second channel table forms a second channel set;

wherein the second channel set comprises more channels than the first channel set.

20. A system for selecting a frequency for communication within a premises network, the system comprising:

a command module including:

a command module telephone line interface operable to be coupled to a premises network;

a command module transceiver; and a command module logic/control unit operable to couple to the command module telephone line interface and the command module transmitter, the command module logic/control unit being operable to select a first channel corresponding to a first frequency over which network communications may be sent from the command module, and a second channel corresponding to a second frequency over which network communications may be received by the command module; and a telephone control module comprising:

a telephone control module telephone line interface operable to be coupled to the premises network;

a telephone control module electronic device interface operable to be coupled to an electronic device;

a telephone control module transceiver operable to be coupled to the command module transceiver to allow communication between the command module; and the telephone control module; and a telephone control module logic/control unit coupled to the telephone control module telephone line interface, the telephone control module electronic device interface and the telephone control module transceiver;

wherein the command module and the telephone control module cooperate to:

execute a first testing function to determine a first signal strength of the first channel, and a second testing function to determine a second signal strength of the second channel; and execute a first screening function to compare the first signal strength to a first threshold value to determine the adequacy of the first channel, and a second screening function to compare the second signal strength to a second threshold value to determine the adequacy of the second channel.

21. The system of claim 20, wherein the first and second testing functions are performed by a carrier detect system.

22. The system of claim 20, wherein the first and second screening functions are performed by a carrier detect system.

23. The system of claim 20, wherein the first and second testing functions are a performed by a received signal strength indicator.

24. The system of claim 20, wherein the command module telephone line interface, the command module transceiver, the telephone control module telephone line interface, and the telephone control module transceiver re operable to be coupled to a site telephone line within a premises network.

25. The system of claim 24, wherein the electronic device comprises a telephone.

26. The device of claim 20, wherein the command module logic/control unit further comprises a command module data storage device having a channel table stored thereon, the channel table comprising an array of channels, wherein each channel corresponds to a frequency within a frequency range; and wherein the first and second channels are selected from the channel table.

27. The device of claim 26, wherein each row of channel table forms a channel set, each channel set being predetermined such that communication over one channel within a particular channel set does not substantially interfere with simultaneous communication over other channels within that channel set.

28. The device of claim 27, wherein the frequency range is above 4 kHz.

29. The device of claim 28, wherein the frequency range is from 1.70 MHz to 4.15 MHz.

30. The device of claim 20, wherein the command module logic/control unit further comprises a command module data storage device having a first channel table and a second channel table stored thereon, the first channel table comprising a first array of channels and the second channel table comprising a second array of channels;

wherein each row of the first channel table form a first channel set, and each row of the second channel table forms a second channel set;

wherein each second channel set includes a larger number of channels than each first channel set; and wherein the first and second channels are selected from the first channel table if a sufficient number of channels in a particular first channel set are available, and otherwise are selected from the second channel table.

* * * * *